Aug. 7, 1945.　　J. F. H. FECHTENBURG　　2,381,583
AEROPLANE CARRIER
Filed Feb. 28, 1942　　6 Sheets-Sheet 3
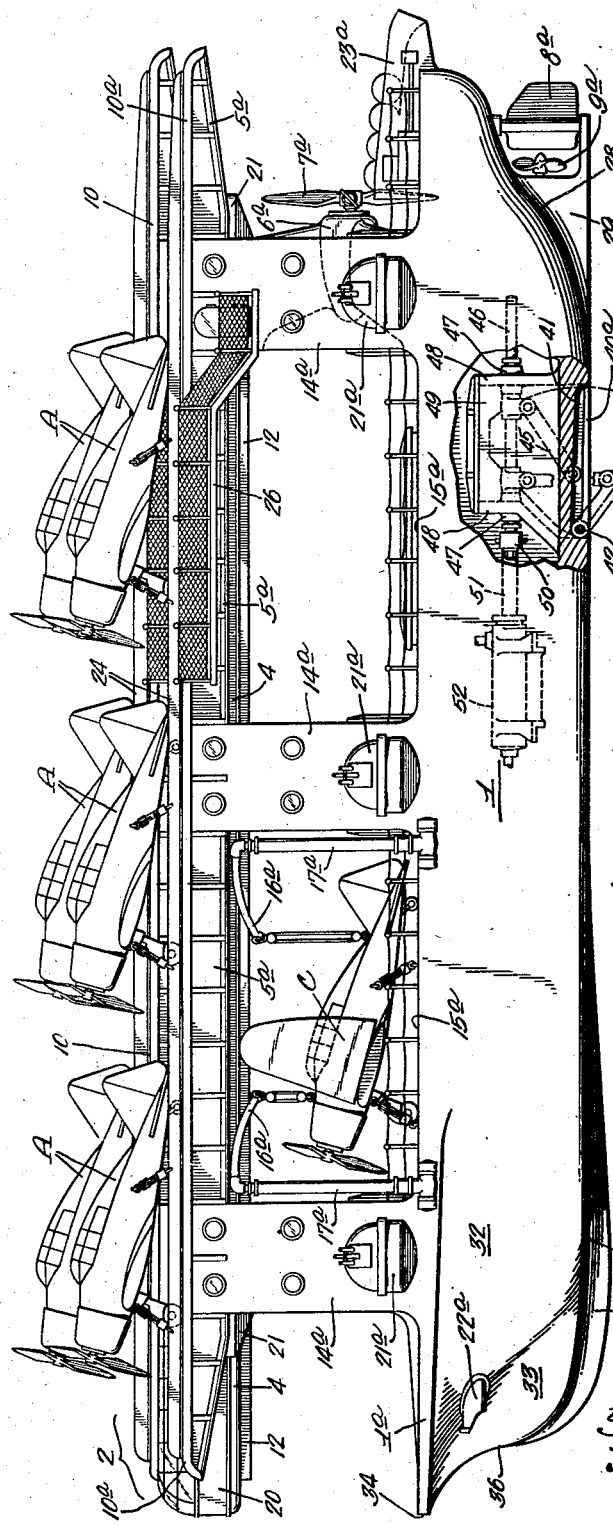

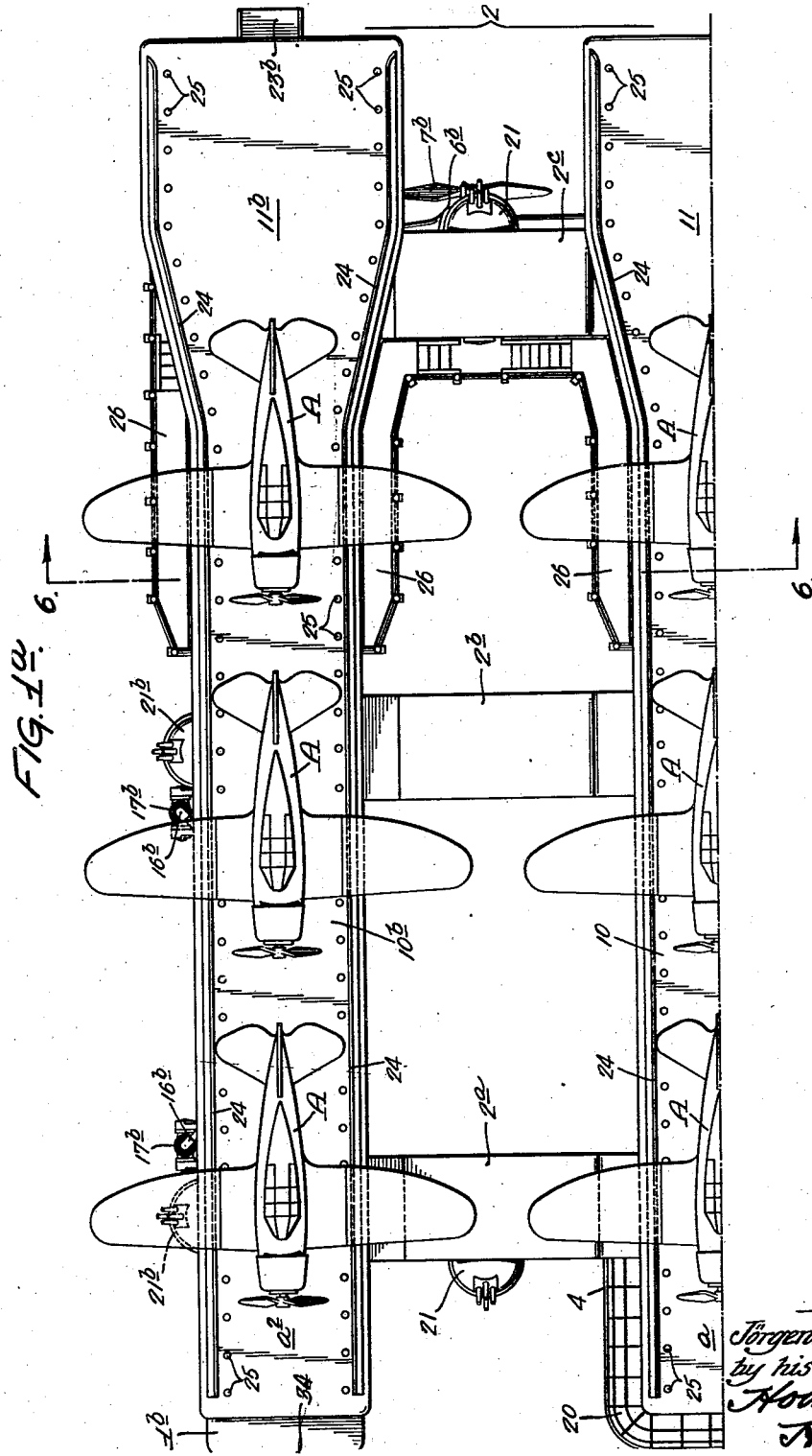

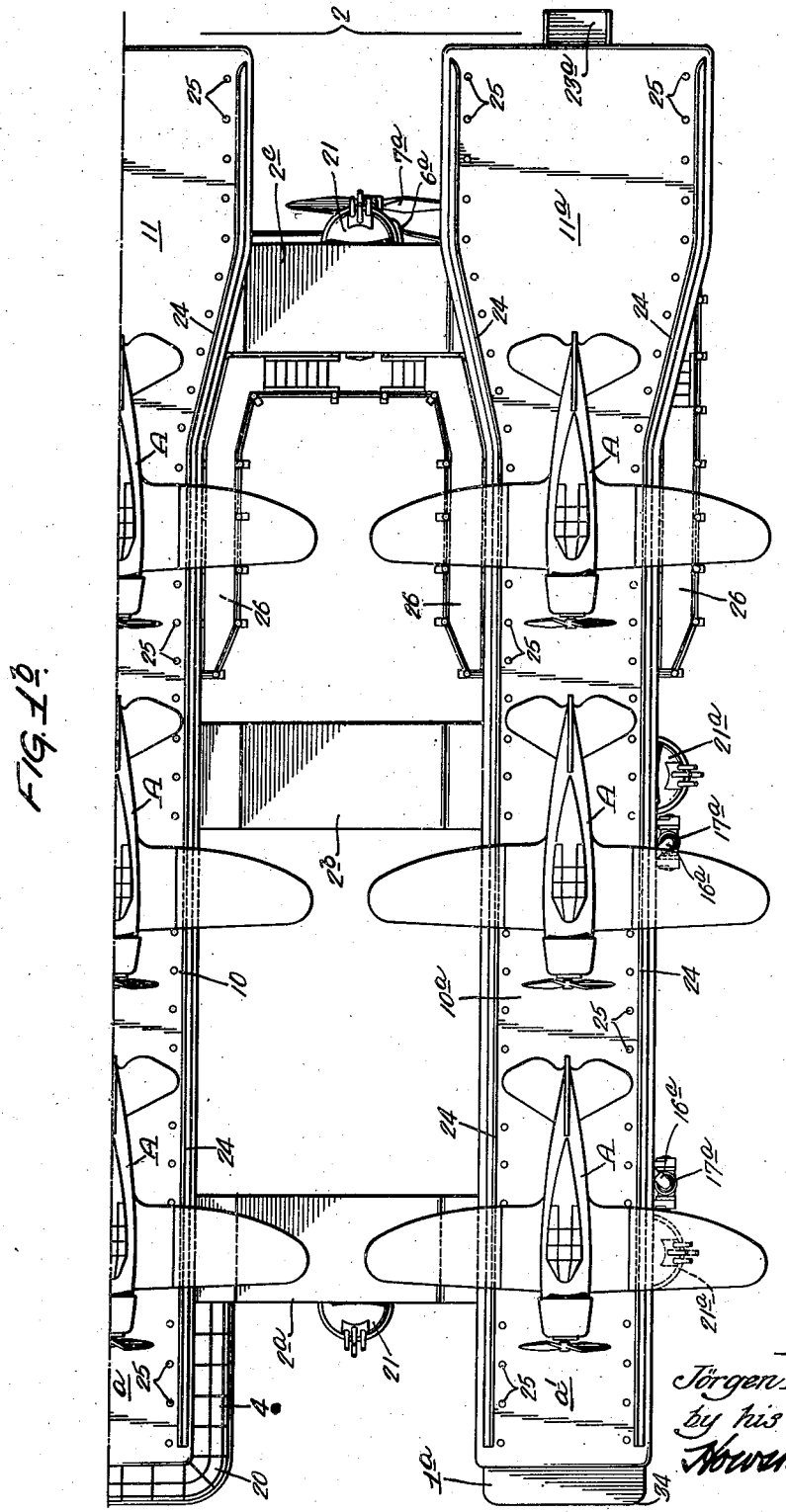

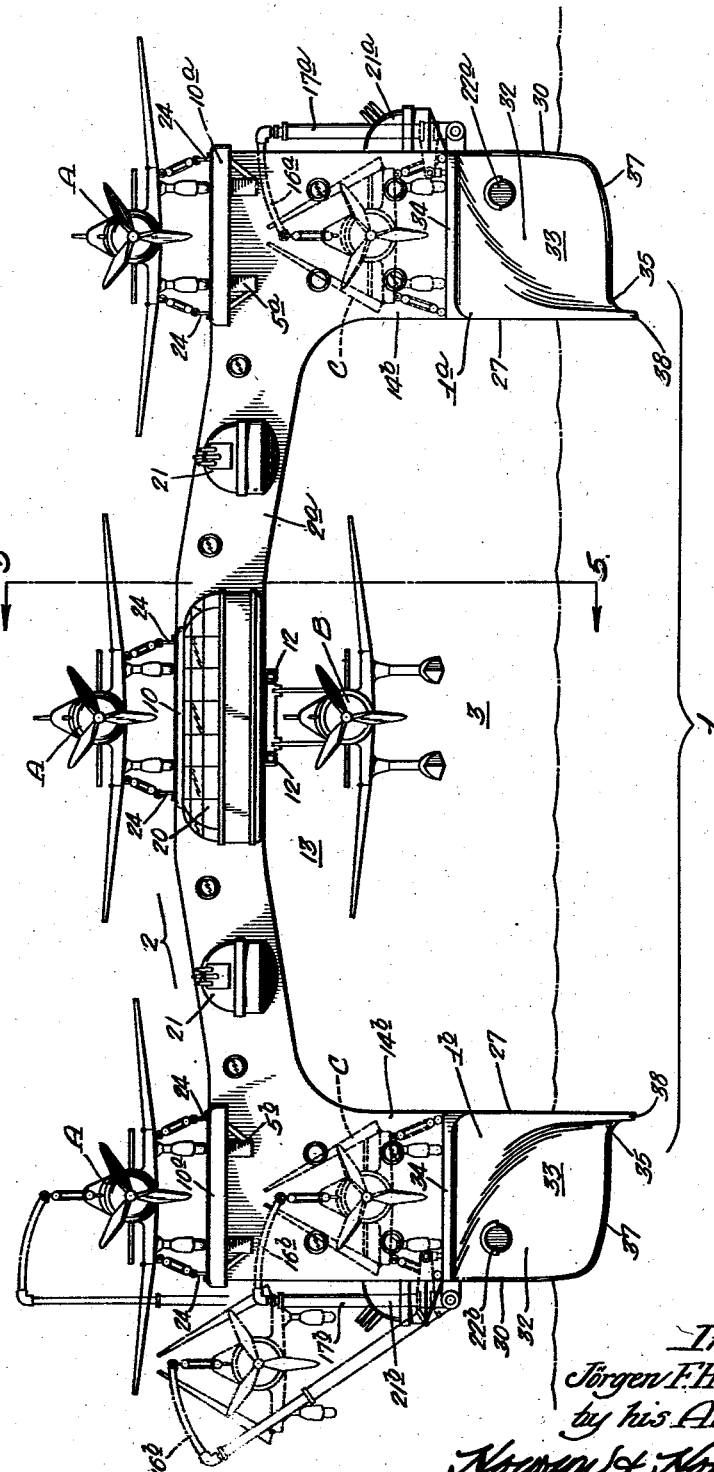

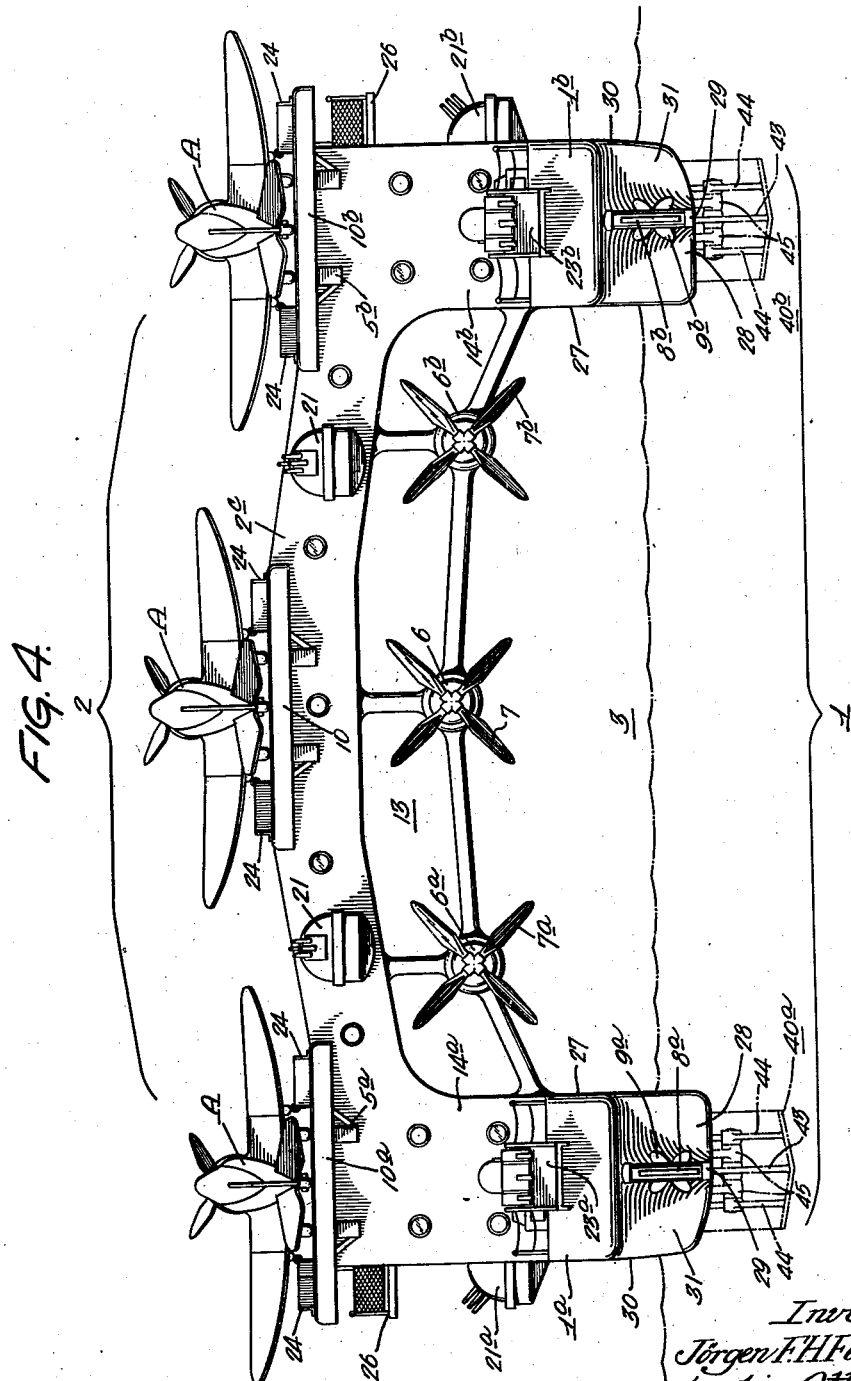

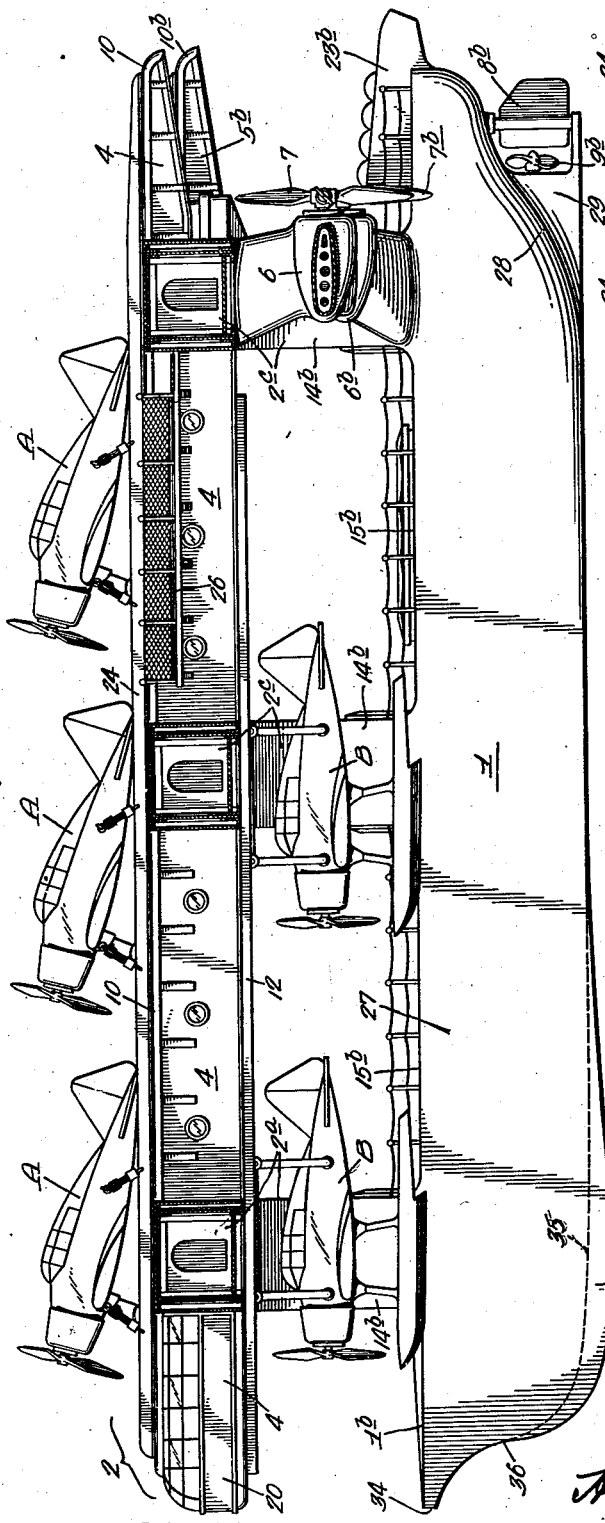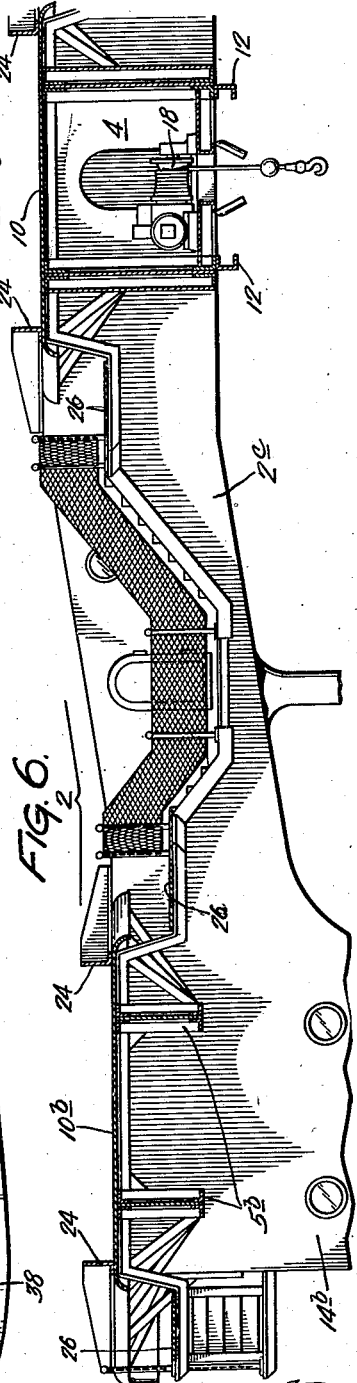

UNITED STATES PATENT OFFICE 2,381,583

AIRPLANE CARRIER

Jörgen F. H. Fechtenburg, Cheltenham Township, Montgomery County, Pa.

Application February 28, 1942, Serial No. 432,853

7 Claims. (Cl. 114—43.5)

This invention relates to a new and novel form of aircraft carrier which is adaptable for use as a floating, mobile, offshore base for intercepter, fighter, and/or light bombing planes, particularly those engaged in coast defense.

One object of the invention is to provide an aircraft carrier which will have a minimum deck area exposed to attack from the air, and minimum broadside, bow and stern exposure to attack by torpedoes launched from air, surface or submarine craft, or gun-fire attack from hostile ship or shore artillery, while at the same time providing maximum plane-storage space and adequate runways for the taking off and landing of the planes.

Another object of the invention is to provide an aircraft carrier for sea duty which will be capable of extremely high speeds, and which will be readily maneuverable at high speeds, as a primary means of defense against attack by enemy air, surface, or submarine craft.

Another object of the invention is to provide an aircraft carrier of minimum weight and maximum stability which will be capable of attaining and maintaining speeds comparable to or greater than the landing and take-off speeds of modern aircraft of the fighter and light bombing types; whereby the aircraft can take off from, or land on, the carrier, while the carrier is under way, thereby reducing to a minimum the deck area necessary for such purposes, and making available greater storage space for planes.

Another object of the invention is to provide an aircraft carrier of a relatively small size and low cost, as compared to the large, expensive, relatively cumbersome and extremely vulnerable airplane carriers employed by the navies of the various nations at the present time; whereby a complement of aircraft equal to or greater than the maximum plane complement of a large modern aircraft carrier may be divided into a large number of relatively small units or squadrons, each with its own base craft, to spread out over an area of the sea many times as large as the maximum area which could possibly be covered by the same number of planes based on and operating from a single large carrier, and at the same time making it impossible for an enemy to destroy the whole of the large force by concentrated attack on one centralized objective, as is possible in the case of the large airplane carriers.

Another object of the invention is to employ the principles of the catamaran in constructing the base craft of the small type carrier of the present invention, with the laterally-spaced hulls of the catamaran designed to reduce or eliminate any building up of the sea in the channel formed by and between the spaced hulls; and to make it possible for the carrier to take on supplies from a submarine, for example, moored to and between the spaced hulls, whereby, in the face of an attack by enemy craft, the supply ship may be cut loose quickly, to submerge, and whereby the carrier may make a quick departure from the spot to foil the attack. If desired, the carrier may act as a base for small submarines or fast surface craft of the so-called "mosquito" type, to operate in conjunction with the planes based on the carrier.

Obviously, the carrier would be equipped with the necessary anti-aircraft guns, and with large and small calibre machine guns, strategically located on the superstructure, decks, etc., for defense purposes.

In the accompanying drawings:

Figs. 1a and 1b constitute a plan view of the carrier;

Fig. 2 is a port-side view;

Fig. 3 is a view from the bow looking aft;

Fig. 4 is a view from the stern looking forward;

Fig. 5 is a longitudinal-sectional view taken on the line 5—5, Fig. 3;

Fig. 6 is an enlarged cross-sectional view taken on the line 6—6, Fig. 1a; and

Figs. 7 and 8 are diagrammatic plan views showing modified forms of the arrangement of the catamaran hulls.

Primarily, the base craft 1 comprises a pair of laterally-spaced hulls 1a and 1b, of which 1a indicates the port side hull, i. e. the hull at the left side of the craft 1 when looking toward the bow, while the starboard hull is indicated at 1b. The twin hulls, 1a—1b, are of similar construction and are held in laterally-spaced parallel relation to each other by a superstructure 2, with a channel 3 formed by and between the two hulls.

The superstructure 2 primarily comprises, in the present instance, three transverse bridge structures 2a, 2b and 2c, respectively located at the forward, midship, and after portions of the base craft 1.

The bridge structures 2a, 2b and 2c are joined together, centrally of the superstructure 2, by a longitudinal structure 4, and at either side thereof, above the port hull 1a and starboard hull 1b, respectively, by longitudinal stringers 5a and 5b.

Carried by the aft bridge 2c, inboard of the base craft 1, over the channel 3, is a plurality of laterally-spaced high speed airplane motors 6, 6a and 6b, of the straight-in-line, V, or radial type and of high power rating, which, in the present instance, drive either fixed or variable pitch airplane propellers, 7, 7a and 7b, of the two, three or four bladed type, preferably the latter.

The combined efforts of the three propellers 7, 7a and 7b, are adapted to cause the craft to travel through the water at a speed at least as great as, and preferably greater than, the take-off and landing speeds of the aircraft for which the carrier is to function as a base.

Each hull, 1a and 1b, is provided with a rudder 8a or 8b, as the case may be, of sufficient size to effect rapid changes in the course of the carrier while the carrier is traveling at relatively high speeds, under the impetus of the three aircraft propellers 7, 7a and 7b, in open water.

For harbor and other relatively slow speed maneuvering, the hulls 1a and 1b are provided with normal ship propellers 9a and 9b, respectively, which are driven by any suitable type of marine engine, preferably "Diesels," located within the hulls 1a and 1b, respectively.

On the upper side of the superstructure 2, in the present instance, are three airplane runways 10, 10a and 10b, respectively, which overlie the longitudinal structure 4 and the side stringers 5a and 5b. The central runway 10 is at a somewhat higher elevation than the side runways 10a and 10b, for wing-tip clearance for the planes on the runways.

The rear end of each runway is flared laterally, to provide a landing deck 11, 11a and 11b, as the case may be, for each runway, with these landing decks in overhanging relation to the stern of the base craft 1. If desired, the runways could be in a single plane with a single landing deck at the stern serving all three runways.

A plurality of airplanes A, A are adapted, normally, to be parked on the runways 10, 10a, 10b, in spaced relation, in files a, a¹ and a², with each plane locked, lashed, or otherwise secured in its place on the runway.

Under the bridge structures 2a, 2b, 2c, and the longitudinal structure 4 of the superstructure 2, the carrier is provided with a trolley-track 12, for suspending one or more seaplanes B, B in the air channel 13, located above the water channel 3.

Between towers 14a, 14b, which form the opposite ends of each of the bridge structures 2a, 2b and 2c, the decks 15a, 15b of the hulls 1a and 1b, respectively, are provided with storage spaces for spare or damaged aircraft C, C.

The planes C, C are adapted to be swung into and out of the storage spaces on the decks of the two hulls, to and from the water, or to and from the top side of the superstructure 2, by any suitable derrick or other hoisting mechanism, etc., such, for example, as davits 16a, 16b having manual or hydraulically-operated telescoping standards 17a, 17b which are pivoted to the hulls 1a and 1b, respectively, on or adjacent the towers 14a, 14b of the bridge structures 2a, 2b, and 2c.

The seaplanes B, B may be picked up from the water from within the water channel 3, by power driven hoisting mechanism 18 carried, for example, by trolleys mounted on the trolley-track 12, or by booms on the hulls 1a and/or 1b at or adjacent the towers 14a, 14b, or in the central longitudinal structure 4, as shown in Fig. 6.

Preferably, the bridge structures 2a, 2b and 2c, including their end towers 14a and 14b, and the longitudinal structure 4, are of hollow construction of sufficient cross-sectional proportions to provide intercommunicating passageways from side to side of the carrier, across the central channel 3, and from end to end of the carrier for the personnel of the carrier to pass from one to the other of the hulls 1a and 1b and from end to end of the carrier. The lower portions of the towers 14a and 14b communicate with the holds of the hulls 1a and 1b, also with the decks of said hulls, and with the cross-structures 2a, 2b and 2c, and are provided with suitable ladders, stairways, etc., for use of the personnel.

Preferably, the forward end of the structure 4, out in front of the bridge structure 2a, beneath the central runway 10, is extended to provide a control cabin 20 for the carrier, with the cabin housing the steering and other navigating apparatus.

At strategic points on the superstructure 2, and, if desired, along the outside of each of the hulls 1a and 1b, gun placement bays are provided to house anti-aircraft, machine guns, etc., for defense of the craft against attack. Also, if desired, the bows of the hulls 1a and 1b may be provided with torpedo tubes and the sterns of the two hulls may be equipped with apparatus for hurling or rolling depth-bombs overboard, astern of the craft. In the present instance, the gun placements on the superstructure 2 are indicated at 21; the gun placements along the hulls 1a and 1b and those on or in the towers 14a and 14b are indicated at 21a and 21b; the torpedo tubes are indicated at 22a and 22b; and the depth-bomb dischargers are indicated at 23a and 23b.

The personnel may be quartered in the bridge structures 2a, 2b and 2c, the towers 14a and 14b, the longitudinal passageway 4, or in the hulls 1a and 1b, below deck.

Obviously, the hulls 1a and 1b will be provided with storage space for supplies and ammunition, spare parts for the planes and necessary machine-shop equipment for making emergency repairs to the planes or to the carrier structure itself, suitable hatches and doorways being provided in the decks of the hulls 1a and 1b and in the towers 14a and 14b to provide for stowing supplies in the hulls.

When on sea duty, in patrolling or in pursuit of enemy craft, the planes A, A, B, B, and C, C are secured in place on the carrier, as previously noted, and the carrier is normally driven by some or all of its engines 6 and propellers 7. Should extra speed be desired above the maximum afforded by the collective efforts of the three engines 6, 6, the engines of the various aircraft may be put into operation to supply additional impelling force by the respective propellers of the airplanes.

When the time arrives for the airplanes A, A to take to the air, the speed of the carrier as a whole is increased or decreased, as the case may be, to the proper take-off speed of the planes, whereupon the foremost planes A, A in the files a, a¹, a², are released from their moorings, and the speeds of their propellers increased to provide the necessary speed differential, between the forward motion of the carrier and that of the plane, to effect the take-off, it being understood that the forward motion of the carrier, as a whole, simulates the pre-take-off run of the airplane normally required for a plane to take-off from a stationary runway of a flying field or from the deck of the large present-day airplane carriers.

In the above manner, the planes in the various files, a, a¹ and a² may take off in succession. The seaplanes B, B, under-slung in the air channel 13, may likewise take off from the track 12 in succession.

It is understood that two-way radio communication would be maintained between the carrier and the various planes in flight, thus, when a plane is ordered to land on the carrier, the forward speed of the carrier and that of the plane are synchronized, while the plane hovers above and follows the identical straight line course of the carrier, whereupon the plane descends gradually from above the carrier until it makes contact with the landing deck 11, 11a or 11b, as the case may be. Upon landing, the engine of the plane is kept running to turn over the propeller at sufficient speed to hold the plane in position on the landing deck, to prevent the carrier from running out from under the plane. The plane is then maneuvered into its storage station on the runway, forward of the landing deck, by a ground crew, stationed along suitable cat-walks 26 provided at the opposite sides of each of the landing decks, and along runways, if desired. The ground crew proceeds to lash the plane in position, after which the motor of the plane may be stopped, if desired.

The runways 10, 10a, 10b, and landing decks 11, 11a and 11b thereof are provided with suitable side guards 24, 24 to prevent the planes from running off the sides of the runways. For night landing, the runway, immediately adjacent these guards may be equipped with spaced lamps 25 projecting beams of light vertically along the side edges of the runways to indicate the location thereof.

In the case of the seaplanes B, these would settle on the water and come to rest while the carrier is maneuvered into a position to straddle the plane, i. e. with the plane within the channel 3, whereupon the hoisting apparatus 18 would be brought into operation to hoist the plane from the water into carrying position in the air channel 13.

The purpose of the planes A, as in the case of planes operating from a large airplane carrier, is to intercept enemy bombers and to give battle to fighter planes protecting the bombers, as well as to attack enemy ships and landing parties attempting to approach and establish beach-heads on the shore, etc., being defended by the planes of the carrier.

The primary function of the seaplanes B would be to give aid to the flyers of any of the planes A which may become disabled, and to rescue pilots from planes which may be shot down in the sea battle, although it will be understood that the seaplanes B, B, as well as the airplanes A, A, may be provided with machine guns, small cannon, or bombs and otherwise equipped to take part in any encounter in which the planes A may become involved.

As previously noted, the carrier may be provisioned from a submarine at sea, by the carrier running astraddle of the submarine, which has come to the surface, with the submarine in position within the channel 3.

In order to prevent building up of the sea in the channel 3, between the hulls 1a and 1b, the channel 3 is entirely free of any obstructions, such as cross ties between the two hulls below the water line, shown in broken lines in Figs. 3 and 4, or at any elevation between the keels of the hulls and the top decks 15a and 15b thereof, which are disposed in a substantially common plane at a substantial height above the water line, and both hulls are provided with substantially flat, vertical, parallel inner sides 27, 27 extending continuously from the stem to a point a short distance forward of the stern of the craft, where the lower stern portion 28 of the inner side 27 of the hull is cut under in a smoothly curving waterslip contour to the shaft-log or skeg 29 for the propeller shaft of the hull.

The outer side 30 of each hull is similarly cut under adjacent the stern to the shaft-log or skeg, as shown at 31.

The forward portion 32 of the outer side 30 of the hull, in each instance, curves inwardly from the substantially vertical plane of the midship portion of said side 30 to the vertical plane of the inner side 27 of the hull; and is also cut under in smooth, rounded contour 33 from the horizontally square, flat nose 34 of the bow, at the deck level, to the keel 35, with the forward line of the bow 36 curving downwardly and aft from said deck level to said keel, in the vertical plane of the inner side 27 of each hull.

The bottom 37 of each hull flares upwardly and outwardly from the keel 35, lying in the vertical plane of the inner side 27 of the hull, to the outer side 30 of the hull and curves smoothly into the bow and stern undercuts 28 and 31 previously noted.

With the bottoms of the two hulls flaring outwardly and upwardly in opposite directions from the vertical inner sides 27, 27 of the hulls 1a and 1b, by which the channel 3 is defined, a modified V bottom craft is provided which, when the craft is under way, especially at high speed, cuts and throws the water outwardly in opposite directions, away from the channel 3, and causes the bow portion of each hull to rise in and out of the water.

To prevent side wash from under the exposed portions of the bottom, aft of the bow, from entering and building up in the channel 3, the forward portions of the inner walls 27 of the two hulls are provided with extensions or fins 38 which are of sufficient depth below the normal keel 35, from the bow to a point amidship, to remain always in the water when the bows of the two hulls rise out of the water.

If desired, instead of making the bridges 2a, 2b, 2c, and the longitudinal passage 4 of boxlike construction to quarter the personnel of the craft therein, these portions and the towers 14, 14a of the superstructure 2 may be made of open truss work composed of tubular members welded together, to cut down wind resistance to a minimum, or the bridges, towers, etc., may be streamlined in any suitable manner for the same purpose without departing from the spirit of the invention.

It is generally recognized that in order for a dive bomber to be effective, it must fly in a straight line directly at its target for a given distance and given time, thus, with a structure of the kind herein described, which is capable of great speed, rapid change of course, and minimum target surface, the possibilities of the craft being struck by a bomb launched from such an attacking plane is reduced to a minimum.

The same is true concerning aerial or other torpedo-launching craft which must be pointed at the target and held on the target in their course for a given period of time.

In order to eliminate any building up of the sea in the water channel 3, which may develop as a result of friction between the water and the vertical parallel sides 27, 27 of the hulls 1a and 1b, it is one of the objects of the present invention to correct such condition by making the channel 3 slightly wider at the stern of the craft than at the bow of the craft, as shown in Figs. 7 and 8 respectively. This may be accomplished in several different ways and for the purpose of the present disclosure the preferred arrangement is to make the vertical flat sides 27, 27 of the two hulls at slightly diverging angles to each other and to the longitudinal center line x—x of the channel 3, from the bow toward the stern of the craft. This may be accomplished by spreading the hulls 1a and 1b bodily, as in Fig. 7, to a greater distance apart at the stern than at the bow, or by leaving the longitudinal axes and the outer sides of the two hulls parallel to each other and making each hull of smaller beam at the stern than at the bow, as indicated in Fig. 8.

As shown in Figs. 2 and 4, the hulls 1a and 1b are provided with water brakes 40a and 40b respectively, each of which comprises a broad gate-like element fitting into a correspondingly broad shallow recess 41 in the bottom of the hull, with the under surface of the brake gate normally flush with the under surface of the hull.

Each brake gate is pivoted at 42 to the hull, to be swung downwardly from the full line position shown in Fig. 2 to the broken line position shown in Figs. 2 and 4, said brake gates being independently and selectively operable from one to the other of said extreme positions or to and from intermediate positions, as desired.

Each brake gate is provided with a stiffening fin 43 and a pair of laterally spaced reinforcing ribs 44 between and to which are pivotally connected the lower ends of a pair of toggle links 45, 45, the upper ends of which are pivotally connected to a pair of horizontally slidable toggle rods 46.

The rods 46 are slidably mounted in bearings 47, 47 formed in the opposite end walls 48, 48 of a sea-tight well 49 which communicates with the brake gate recess 41 and houses the toggle linkage by which the brake gates are operated.

The toggle rods 46 are connected to a cross head 50 to which is also connected one end of a hydraulic or pneumatic ram or piston rod 51 operable by a piston in a cylinder 52, which is secured in fixed position in the hull 1a or 1b, as the case may be.

Assuming that the craft is traveling in a straight line, at high speed, directly at a target, and that it discharges one or more torpedoes from its tubes 22a, 22b, it may be desirable to check the speed of the craft abruptly to avoid collision with the target. This is accomplished by operating both water brake gates 40a, 40b into their broken line positions simultaneously. Obviously the speed of the driving propellers 7, 7a and 7b would be reduced accordingly, at the same time.

The above method can also be employed efficiently to suddenly check the speed of the craft to avoid a torpedo discharged by an enemy and which was fired at a lead calculated, at the speed the craft had been traveling, to make contact with the craft at a predetermined point of intersection of the line of travel of the craft and the line of travel of the projectile. Thus, by slowing up the craft abruptly the projectile will be avoided.

In addition to the above, the craft, while traveling at high speed may be caused to turn sharply to port or starboard by operating but one or the other of the water brakes 40a or 40b, at the same time as the rudders 8a and 8b are swung to effect such a turn. The resistance to the forward progress of the one hull, as provided by the depressed water brake thereon, will cause the other hull to swing sharply in an arc of which the depressed brake would constitute the center, or substantially so.

Obviously the water brake gates, the rudders, the propellers etc., are operated, through any suitable remote control mechanism, from the control cabin 20, or by individuals stationed at the various devices under a suitable system of visual signals in the event of the control cabin being put out of commission by enemy gunfire.

I claim:

1. An aircraft carrier, comprising a pair of laterally spaced hulls with a channel therebetween, a plurality of bridge structures spanning said channel at spaced intervals along said hulls for maintaining said hulls in said spaced relation, and a plurality of independent laterally spaced aircraft runways extending longitudinally of said hulls on top of said bridge structures.

2. An aircraft carrier, comprising a pair of laterally spaced hulls with a channel therebetween, a plurality of bridge structures spanning said channel at spaced intervals along said hulls for maintaining said hulls in said spaced relation, a plurality of independent laterally spaced aircraft runways of uniform predetermined widths respectively extending longitudinally of said hulls on the top side of said bridge structures, and a landing deck of relatively greater width than each runway for aircraft adjacent the stern of the carrier and communicating with each runway.

3. An aircraft carrier, comprising a pair of laterally spaced hulls with a channel therebetween, a plurality of bridge structures spanning said channel at spaced intervals along said hulls for maintaining said hulls in said spaced relation, a plurality of independent laterally spaced aircraft runways of uniform predetermined widths respectively extending longitudinally of said hulls on top of said bridge structures, a landing deck of relatively greater width than each runway for and communicating with each runway at the stern of the carrier, and catwalks along the sides of the runways adjacent the landing decks thereof.

4. An aircraft carrier, comprising a pair of decked laterally spaced hulls with a channel therebetween, a plurality of bridge structures spanning said channel at spaced intervals along said hulls for maintaining said hulls in said spaced relation, a plurality of independent laterally spaced aircraft runways extending longitudinally of and respectively situated above said hulls on top of said bridge structures, and storage areas for aircraft on the decks of said hulls beneath the outermost of said independent runways intermediate successive bridge structures.

5. An aircraft carrier, comprising a pair of decked laterally spaced hulls with a channel therebetween, a plurality of bridge structures spanning said channel at spaced intervals along said hulls for maintaining said hulls in said spaced relation, a plurality of independent laterally spaced aircraft runways extending longitudinally of and respectively situated above said hulls on top of said bridge structures, storage areas for aircraft on the decks of said hulls beneath the outermost of said independent runways intermediate successive bridge structures, and means for transferring aircraft from said outermost storage spaces to said runways respectively and vice versa.

6. An aircraft carrier, comprising a pair of laterally spaced hulls with a channel therebetween, a plurality of bridge structures spanning said channel at spaced intervals along said hulls for maintaining said hulls in said spaced relation, a longitudinally extending aircraft hanger support carried by the undersides of said bridge structures above said channel, and means for hoisting aircraft from the water in said channel to said support.

7. An aircraft carrier comprising a pair of laterally spaced connected hulls, including substantially flat vertical inner sides forming a free unobstructed channel therebetween, laterally spaced outer sides curving inwardly toward and joining with said flat vertical inner sides in the planes of the latter to form the bows of said hulls respectively, bottoms flaring upwardly and outwardly from the bottom edges of said inner sides to said outer sides, and a fin on each hull in the plane of the flat inner wall thereof and extending forwardly and downwardly beyond a line on each of said inner walls where the under surface of said bottoms would normally intersect with the flat inner walls of the hulls respectively.

JÖRGEN F. H. FECHTENBURG.